No. 795,976. PATENTED AUG. 1, 1905.
A. T. HERRICK.
PIPE COUPLING.
APPLICATION FILED SEPT. 15, 1904.
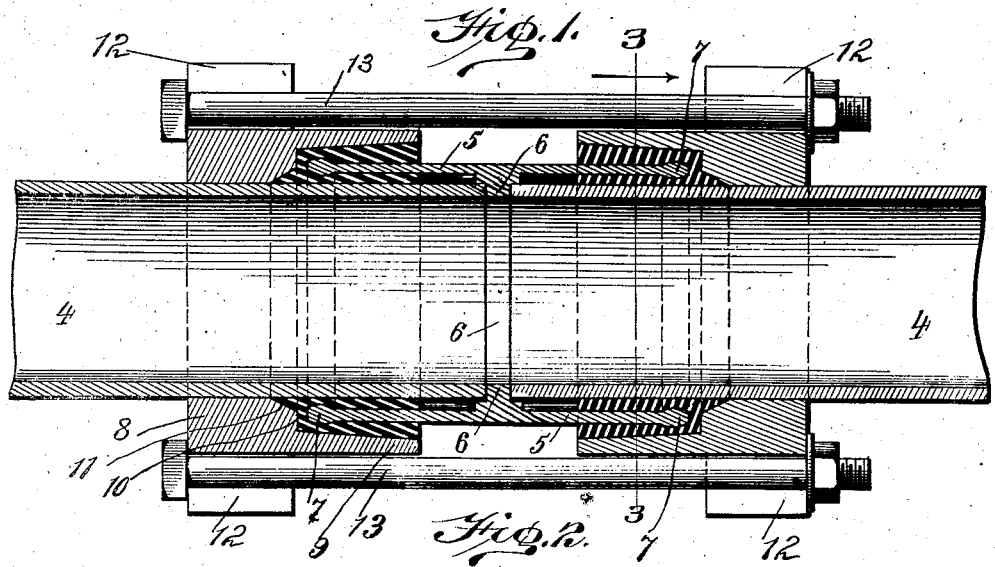
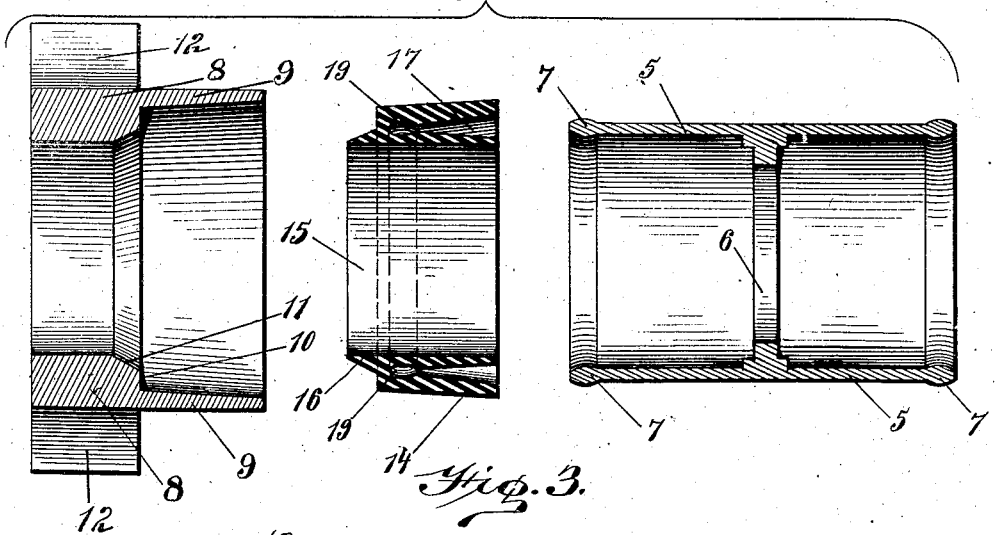
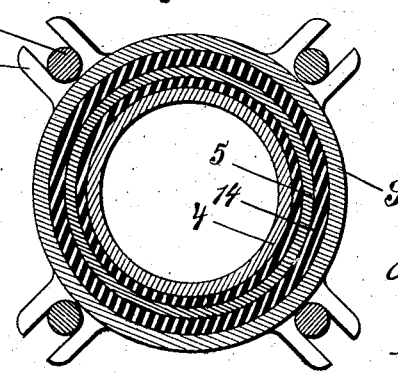
WITNESSES:
INVENTOR
Austin T. Herrick
BY
Knight Bros.
Attorneys

UNITED STATES PATENT OFFICE.

AUSTIN T. HERRICK, OF BRADFORD, PENNSYLVANIA.

PIPE-COUPLING.

No. 795,976.    Specification of Letters Patent.    Patented Aug. 1, 1905.

Application filed September 15, 1904. Serial No. 224,523.

*To all whom it may concern:*

Be it known that I, AUSTIN T. HERRICK, a citizen of the United States, residing at Bradford, county of McKean, State of Pennsylvania, have invented certain new and useful Improvements in Pipe-Couplings, of which the following is a specification.

In the drawings, Figure 1 is a longitudinal sectional view of a pipe-coupling embodying my invention. Fig. 2 is a view of the same parts segregated. Fig. 3 is a transverse sectional view on the line 3 3, Fig. 1, looking in the direction of the arrow.

4 represents the pipe.

5 is the sleeve, within which the ends of the pipe are adapted to enter, said sleeve being provided with a T-shaped annular projection 6 on its interior, positioned about in the center thereof, the diameter between the heads of the T-shaped projection being equal to the diameter of the ends of the pipe 4, the ends of said pipe resting upon the head of the T-shaped projection and abutting the stem of the T-shaped projection, as shown in Fig. 1. The ends of the sleeve are provided with an interior and exterior bead 7, substantially wedge-shaped in cross-section, as more clearly shown in Fig. 2.

The collars 8 are provided with an annular laterally-extending flange 9, the interior bore of which is slightly tapering, as clearly shown in Fig. 2, at the bottom of which taper is formed a shoulder 10, from which extends a bevel-face 11. The collar is provided with the usual radially-extending lugs 12, between which the bolts 13 are secured. It will be understood that these lugs may be perforated instead of being arranged in pairs, as shown in the present drawings.

The resilient packing-ring 14 may be of any suitable material—such as rubber, cork, &c.—but is for purposes of illustration shown as being composed of rubber, said ring being provided with a straight annular bore 15, while its exterior periphery is slightly wedge-shaped or tapering in order to insure the tight packing within the tapering annular flange 9 of the collar.

16 is a laterally-extending flange integral with the packing-ring 14 and of half-V or wedge shape in cross-section and adapted to be seated upon the bevel-face or seat 11 of the collar 8. The packing-ring is provided with a V-shaped annular groove 17, terminating in an elliptical or double wedge-shaped groove 19 at its lower end and adapted to receive the wedge-shaped beads 7 on the end of the sleeve 5. In this connection it will be noted that the groove formed of the combined grooves 17 and 19 terminates near the bottom of the packing-ring, thus providing for the packing of the major portion of the length of the ring around the pipe and sleeve, thus insuring a large area for friction between the packing-ring, the pipe, the collar, and the sleeve, whereby the strength of the joint is very materially increased and enabling the joint to withstand the maximum pressure.

Upon examining Fig. 1 it will be noted that the pipe has a solid bearing of metal within the collar and upon the head of the T-shaped lug within the sleeve, thus holding the pipe in alinement at the joint.

In assembling the parts the ends of the pipe are slid into the sleeve. The packing-ring and the collars are then moved up upon the sleeve, the ends of the sleeve entering the groove in the packing-ring, and upon manipulation of the nuts on the bolts 13 the ends of the sleeve are forced to the bottom of the groove in the packing-ring, whereby the packing-ring is firmly wedged in the bevel-seat 11, the tapering bowl of the collar, and around the pipe. The tighter the nuts are drawn the greater will be the compression of the packing-ring and the closer the joint.

I have not herein claimed the packing-ring having an enlargement at the base of the annular groove, as this feature is claimed in my copending application, filed September 15, 1904, Serial No. 224,521.

Having thus described the invention, what I claim, and desire to secure by Letters Patent, is—

1. In a pipe-coupling, the combination with the annular sleeve having a T-shaped annular projection formed on its interior face, near the center thereof and enlarged beads at its ends, of collars having enlarged bores, and packing-rings fitted within the collars, having annular grooves into which the beaded ends of the sleeve project and being of a length to extend within and to surround the sleeve beyond the beaded portions.

2. In a pipe-coupling, the combination of the sleeve having enlarged beaded ends, a pair of collars having enlarged bores, and a pair of packing-rings each fitted into one of the enlarged bores and having an annular groove into which one of the beaded ends project.

3. A packing-ring having a shoulder intermediate its ends, an annular groove on one side of the shoulder, and an annular wedge-shaped portion on the other side of the shoulder.

4. A packing-ring having a shoulder intermediate its ends, an annular groove on one side of the shoulder, and an annular wedge-shaped portion on the other side of the shoulder, the inner wall of the wedge-shaped portion being in alinement with the inner wall of the ring.

5. A packing-ring provided with an annular wedge-shaped groove and an enlarged elliptical groove at the base of the wedge-shaped groove.

6. A packing-ring provided with a shoulder intermediate its ends; an annular groove on one side of the shoulder having a wedge-shaped portion and an enlarged portion at the base of the wedge-shaped portion; and an annular wedge-shaped portion on the other side of the shoulder, the inner wall of the wedge-shaped portion being in alinement with the inner wall of the ring.

7. In a pipe-coupling, the combination with a sleeve, double wedge-shaped beads integral with the end of said sleeve, and a T-shaped annular projection on the interior of said sleeve, of collars, an annular flange integral with said collar and having a tapering bore, a bevel-face at the base of the tapering bore and a tapering packing-ring having an annular wedge-shaped groove terminating in a double wedge-shaped groove, and a wedge-shaped annular lug integral with the bottom of said ring.

The foregoing specification signed this 12th day of September, 1904.

AUSTIN T. HERRICK.

In presence of—
EDWIN S. CLARKSON,
JNO. R. ADAMS.